United States Patent
Takagi

(10) Patent No.: US 8,285,882 B2
(45) Date of Patent: Oct. 9, 2012

(54) OUTPUT APPARATUS, INFORMATION PROCESSING APPARATUS, AND NETWORK SYSTEM

(75) Inventor: Eiji Takagi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 175 days.

(21) Appl. No.: 12/697,820

(22) Filed: Feb. 1, 2010

(65) Prior Publication Data

US 2010/0228883 A1  Sep. 9, 2010

(30) Foreign Application Priority Data

Mar. 6, 2009  (JP) ................................. 2009-053469

(51) Int. Cl.
*G06F 3/00*  (2006.01)
(52) U.S. Cl. ............................................... 710/4; 710/9
(58) Field of Classification Search ........................ None
See application file for complete search history.

(56) References Cited

U.S. PATENT DOCUMENTS

| | | | |
|---|---|---|---|
| 2002/0035941 A1* | 3/2002 | Nakao ........................... | 101/484 |
| 2005/0068565 A1* | 3/2005 | Maeda .......................... | 358/1.15 |
| 2006/0047853 A1* | 3/2006 | Igarashi et al. ............... | 709/245 |
| 2006/0067360 A1* | 3/2006 | Ohara .......................... | 370/465 |
| 2006/0168164 A1* | 7/2006 | Lemson et al. ............... | 709/221 |
| 2006/0206608 A1 | 9/2006 | Naito et al. .................... | 709/224 |
| 2006/0221863 A1* | 10/2006 | Ishimoto et al. .............. | 370/254 |
| 2006/0252415 A1* | 11/2006 | Lazaridis et al. ............. | 455/415 |
| 2007/0283028 A1* | 12/2007 | Gilroy et al. .................. | 709/230 |
| 2009/0103126 A1* | 4/2009 | Park ............................. | 358/1.15 |

FOREIGN PATENT DOCUMENTS

| | | |
|---|---|---|
| JP | 2001-092761 | 4/2001 |
| JP | 2006-254137 | 9/2006 |
| JP | 2007-055124 | 3/2007 |

* cited by examiner

*Primary Examiner* — Kris Rhu
(74) *Attorney, Agent, or Firm* — DLA Piper LLP (US)

(57) ABSTRACT

An output apparatus includes an IP-address setting unit, a setting change detection unit, and a notification information creation unit. The IP-address setting unit sets an IP address of the output apparatus. The setting change detection unit detects a change in the setting of the IP-address setting unit. The notification information creation unit creates information that will be notified to a device that satisfies predetermined conditions upon detection of the setting change by the setting change detection unit.

7 Claims, 13 Drawing Sheets

PRINT OUTPUT DATA RECEPTION HISTORY

| RECEIVED OUTPUT DATA | TIME AND DATE | TRANSMISSION SOURCE IP ADDRESS | OUTPUT DATA |
|---|---|---|---|
| 0001 | 02/02/2009 07:25:30 | 192.168.100.203 | D1 |
| 0002 | 02/02/2009 07:40:10 | 192.168.100.201 | D2 |
| 0003 | 02/02/2009 07:53:25 | 192.168.100.202 | D3 |
| 0004 | 02/02/2009 08:11:20 | 192.168.100.204 | D4 |
| 0005 | 02/02/2009 08:37:50 | 192.168.100.205 | D5 |
| 0006 | 02/02/2009 08:43:30 | 192.168.100.203 | D6 |
| 0007 | 02/02/2009 09:05:00 | 192.168.100.205 | D7 |

| NO. | TRANSMISSION SOURCE IP ADDRESS | TIME AND DATE OF THE LAST USE |
|---|---|---|
| 1 | 192.168.100.201 | 02/02/2009 07:40:10 |
| 2 | 192.168.100.202 | 02/02/2009 07:53:25 |
| 3 | 192.168.100.203 | 02/02/2009 08:43:30 |
| 4 | 192.168.100.204 | 02/02/2009 08:11:20 |
| 5 | 192.168.100.205 | 02/02/2009 09:05:00 |

PROCESSING PERFORMED AT COMPUTER

OUTPUT APPARATUS, INFORMATION PROCESSING APPARATUS, AND NETWORK SYSTEM

BACKGROUND

1. Technical Field

The present invention relates to an output apparatus whose network-related settings can be changed through the operation of an operation panel or the like, an information processing apparatus such as a personal computer that is connected to the output apparatus via a network, and a network system that includes the output apparatus and the information processing apparatus.

2. Related Art

To connect information processing devices such as personal computers to one another via a network or to share an output apparatus such as a multifunction printer or a simple printer among a plurality of information processing devices over a network, it is necessary to configure administrative setting on each of the information processing devices and the output apparatus. The administrative setting includes network protocol setting (e.g., IP-address setting for inter-device identification over a network), user registration, access condition setting, and the like. For example, dedicated administration software (a management tool) that is different from application software that requires the use of the functions of the output apparatus for outputting is used for configuring such administrative setting when the output apparatus is connected to the network. Or, the operation panel of the output apparatus is used for configuring the administrative setting. A user who is duly authorized and registered as a network administrator performs administrative setting processing. The network administrator is allowed to access the system by inputting an administrator ID or an administrator password. Accordingly, the network administrator has sole authority to configure such administrative setting in an exclusive and integrated fashion.

An output apparatus that has an assigned IP address and allows information processing devices such as personal computers to use the functions of the output apparatus over a network is disclosed in JP-A-2001-92761.

A network administrator sometimes changes an IP address that is assigned to an output apparatus when, for example, office floor layout is changed. In such an occasion, it is necessary for the network administrator to inform users who use the functions of the output apparatus of the change in the IP address of the output apparatus. This necessity places an administrative burden on the network administrator, which is a problem that remains to be solved. On the other hand, in a case where the network administrator neglects his/her duty of notifying the change in the IP address of the output apparatus to the users, the users will be denied access to the output apparatus for printing, which is another problem that needs to be solved.

SUMMARY

An advantage of some aspects of the invention is to provide an output apparatus that can reduce the administrative burden of a network administrator and enables users to continue the use of the output apparatus even when a setting change occurs in the output apparatus.

In order to address the above-identified problems without any limitation thereto, an output apparatus according to a first aspect of the invention includes: an IP address setting section that sets an IP address of the output apparatus; a setting change detecting section that detects a change in setting of the IP address setting section; and a notification information creating section that creates information that will be notified to a device that satisfies predetermined conditions upon detection of the setting change by the setting change detecting section.

In the configuration of an output apparatus according to the first aspect of the invention, it is preferable that the device that satisfies the predetermined conditions should be a device that transmitted output data to the output apparatus within a predetermined time period. It is preferable that an output apparatus having the preferred configuration described above should further include an address memorizing section that memorizes an IP address of the device that transmitted the output data to the output apparatus. An output apparatus according to a second aspect of the invention includes: an IP address setting section that sets an IP address of the output apparatus; a setting change detecting section that detects new setting of the IP address setting section when the setting is configured anew; and a notification information creating section that creates information that will be notified to a device that satisfies predetermined conditions upon detection of the new setting by the setting change detecting section.

In the configuration of an output apparatus according to the first aspect of the invention, it is preferable that the device that satisfies the predetermined conditions should be a device that is connected to the same local area network as that of the output apparatus.

In the configuration of an output apparatus according to the first aspect of the invention, the device that satisfies the predetermined conditions may be a device that is connected to the same sub network as that of the output apparatus.

An information processing apparatus according to a third aspect of the invention includes: an IP address registering section that performs registration processing related to an IP address of an output apparatus; a receiving section that receives, from the output apparatus, data for notifying the information processing apparatus that the IP address of the output apparatus has been changed; and a registration information changing section that changes registration information held by the IP address registering section upon reception of the data that notifies the information processing apparatus of the change in the IP address of the output apparatus by the receiving section.

A network system according to a fourth aspect of the invention includes an output apparatus and an information processing apparatus. The output apparatus includes an IP address setting section that sets an IP address of the output apparatus, a setting change detecting section that detects a change in setting of the IP address setting section, and a notification information creating section that creates information that will be notified to a device that satisfies predetermined conditions upon detection of the setting change by the setting change detecting section. The information processing apparatus includes an IP address registering section that performs registration processing related to an IP address of an output apparatus, a receiving section that receives, from the output apparatus, data for notifying the information processing apparatus that the IP address of the output apparatus has been changed, and a registration information changing section that changes registration information held by the IP address registering section upon reception of the data that notifies the information processing apparatus of the change in the IP address of the output apparatus by the receiving section.

When a change in the setting of an IP address setting section is detected, a notification information creating section creates information that will be notified to a device that satisfies predetermined conditions. Having such a configuration, an output apparatus according to an aspect of the invention eliminates need for a network administrator to inform users who use the functions of the output apparatus of the IP-address change. Therefore, the administrative burden of the network administrator is reduced. Moreover, since it is possible to ensure that the occurrence of the IP-address change will be always notified to the users who use the functions of the output apparatus, the users will not be affected by the IP-address change due to, for example, a change in office floor layout and thus can continue the use of the output apparatus.

An information processing apparatus according to the third aspect of the invention ensures that a change in the IP address of an output apparatus will be always notified to users who use the functions of the output apparatus. Therefore, the users will not be affected by the IP-address change due to, for example, a change in office floor layout and thus can continue the use of the output apparatus.

A network system according to the fourth aspect of the invention offers the following advantages. When a change in the setting of an IP address setting section is detected, a notification information creating section creates information that will be notified to a device that satisfies predetermined conditions. Having such a configuration, an output apparatus eliminates need for a network administrator to inform users who use the functions of the output apparatus of the IP-address change. Therefore, the administrative burden of the network administrator is reduced. Moreover, since it is possible to ensure that the occurrence of the IP-address change will be always notified to the users who use the functions of the output apparatus, the users will not be affected by the IP-address change due to, for example, a change in office floor layout and thus can continue the use of the output apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

With reference to the accompanying drawings, exemplary embodiments of the present invention will now be explained in detail. In the following description of exemplary embodiments of the invention, a multifunction printer (i.e., multifunction machine) is taken as an example of an output apparatus according to an aspect of the invention. However, the applicable scope of the invention is not limited to a multifunction printer. The invention can be applied to various kinds of an apparatus such as a facsimile machine that includes a printing unit and a scanning unit.

Figure 1:
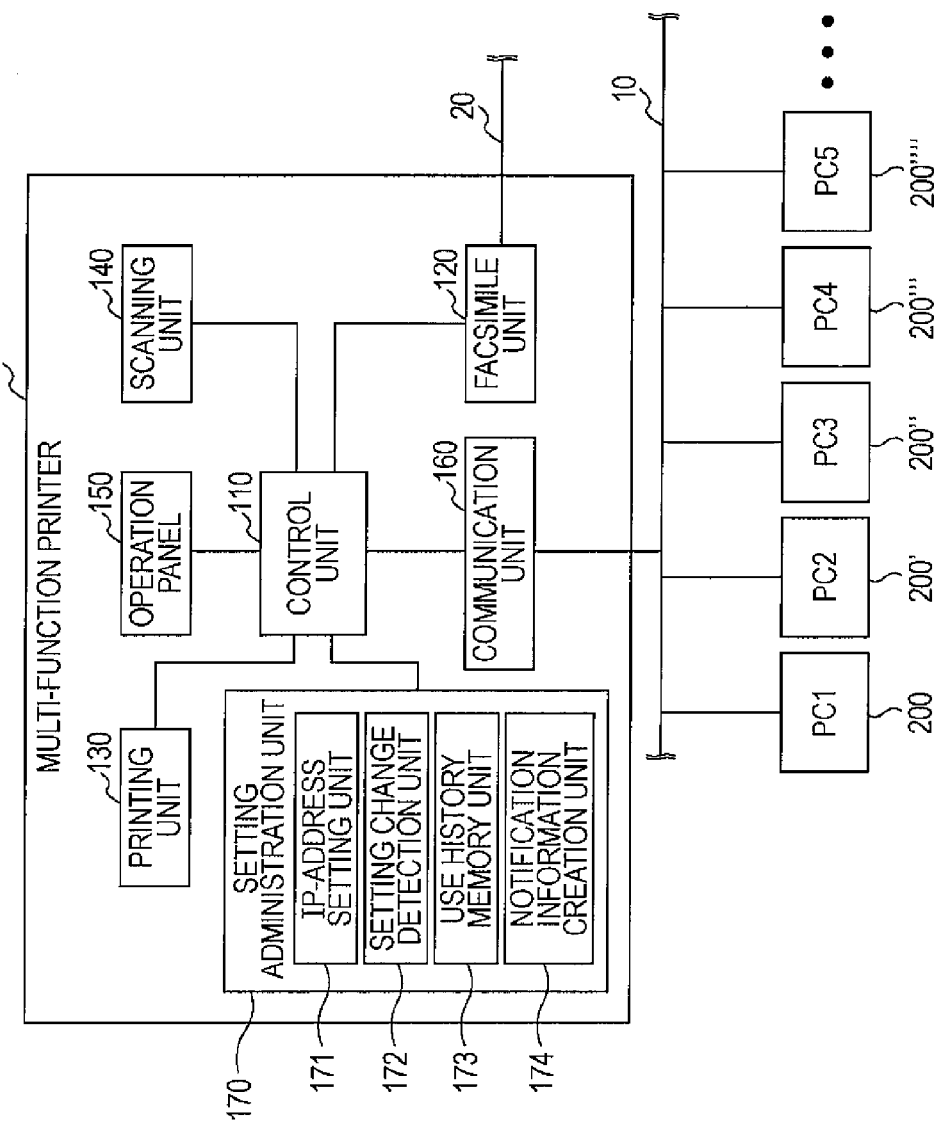
FIG. 1 is a block diagram that schematically illustrates an example of the configuration of an output apparatus (multifunction printer) and peripheral system devices according to an exemplary embodiment of the invention.

FIG. 1 is a block diagram that schematically illustrates an example of the configuration of an output apparatus (multifunction printer) and peripheral system devices according to an exemplary embodiment of the invention. In FIG. 1, the reference numeral 10 denotes a network such as a LAN. The numeral 20 denotes a telephone line. The numeral 100 denotes a multifunction printer. The numeral 110 denotes a control unit, which is the main controller of the multifunction printer 100. The numeral 120 denotes a facsimile unit, which transmits and receives a facsimile document. The numeral 130 denotes a printing unit, which performs printing on a print target medium. The numeral 140 denotes a scanning unit, which reads an original document. The numeral 150 denotes an operation panel, which is a user interface. The numeral 160 denotes a communication unit. The numeral 170 denotes a setting administration unit. The numeral 171 denotes an IP-address setting unit. The numeral 172 denotes a setting change detection unit. The numeral 173 denotes a use history memory unit. The numeral 174 denotes a notification information creation unit. Finally, each of the reference numerals 200, 200', 200'', 200''', . . . denotes a personal computer, which is an example of an information processing apparatus according to an aspect of the invention. In the following description of this specification, the facsimile unit 120, the printing unit 130, the scanning unit 140, and the operation panel 150 may mean or be referred to as a facsimile device, a printing device, a scanning device, and an operation panel device or the like, respectively.

As peripheral system devices, the personal computers 200, 200', 200'', 200''', . . . such as client PCs are connected to the multifunction printer 100 (output apparatus) via the network 10 as illustrated in FIG. 1. The facsimile unit 120 of the multifunction printer 100 is connected to the telephone line 20.

The multifunction printer 100 is provided with the control unit 110, which controls the operation of the multifunction printer 100 functioning as an information processing device, the operation panel 150, which is an input/output device that accepts input operation of a user, the scanning unit 140, which scans an original to acquire a color image, the printing unit 130, which prints an image on a sheet of printing paper or the like, and the facsimile, unit 120, which performs facsimile transmission/reception. That is, the multifunction printer 100 has a scanning function, a printing function, a copying function, and a facsimile transmission/reception function. The copying function is a combination of the scanning function and the printing function.

Each of the information processing units of the multifunction printer 100 is configured as, for example, a general-purpose computer system. Each of individual elements or functional blocks thereof is embodied/implemented as a result of, for example, execution of a computer program stored in a memory means.

The scanning unit 140 includes an original document table on which an original can be placed and an optical scanning system for reading the original. The original document table and the optical scanning system are not shown in the drawing. An original size detection sensor is provided at the original document table of the scanning unit 140. The original size detection sensor is capable of detecting the size of an original placed on the original document table. An automatic document feeder (ADF) may be provided as a component of the scanning unit 140 of the multifunction printer 100. The ADF feeds sheets of original one after another automatically.

An image of an original read by the scanning unit 140 is temporarily stored in a memory (not shown) of the control unit 110. In response to an instruction given by a user through the operation panel 150 or the like, or in response to other trigger, the control unit 110 performs print-output control, facsimile transmission control, network transmission control, or the like. For example, to implement the copying function of the multifunction printer 100, the control unit 110 causes the printing unit 130 to output image data of an original read by the scanning unit 140 on a sheet of printing paper either with 1× magnification or after scaling with a specified magnification. To implement the facsimile function of the multifunction printer 100, the control unit 110 causes the facsimile unit 120 to send out the image data via the telephone line 20. To implement the scanned-image network transmission function (scanning function) of the multifunction printer 100, the control unit 110 causes the communication unit 160 to transmit the image data to the personal computers 200, 200', 200'', 200''', . . . via the network 10.

A mode of the multifunction printer 100 under which the copying function is used is defined as a "copy mode". A mode of the multifunction printer 100 under which the facsimile transmission function of the facsimile function is used is defined as a "send-by-fax mode". A mode of the multifunction printer 100 under which the scanning function is used is defined as a "scan mode". In addition, as a kind of the send-by-fax mode, a function of transmitting data such as a document created with the use of application software that runs on a personal computer via facsimile on the basis of a command issued from the personal computer 200, 200', 200'', 200''', . . . is defined as a "PCFAX mode".

The printing unit 130 records an image on a sheet of recording paper. A well-known hardware configuration such as an electro-photographic printing mechanism, an ink-jet printing mechanism, or the like may be used. In an electro-photographic scheme, a laser head, an LED line head, or the like forms a latent image on a photosensitive member. In an ink-jet scheme, a head ejects ink directly on a sheet of recording paper. The control unit 110 causes the printing unit 130 to print out an image on paper on the basis of an instruction given through the operation panel 150 or an instruction given from the personal computer 200, 200', 200'', 200''', . . . . That is, the printing unit 130 outputs image data read by the scanning unit 140, facsimile data received by the facsimile unit 120, application data created with the use of application software that runs on the personal computer 200, 200', 200'', 200''', . . . , or the like.

The facsimile unit 120, which is connected to the telephone line 20, includes a facsimile transmission/reception unit (not shown) and a facsimile memory. The facsimile transceiver unit performs transmission/reception via facsimile. The facsimile memory is used as a transmission buffer and a reception buffer. The transmission buffer temporarily stores transmission data, which is data that is to be sent out by the facsimile transmission/reception unit. The reception buffer temporarily stores reception data, which is data that has been received by the facsimile transmission/reception unit.

Upon receiving incoming data through the telephone line 20 via facsimile, the facsimile unit 120 stores the received data temporarily. The stored data is sent to the control unit 110 and then printed out by the printing unit 130. The facsimile unit 120 performs facsimile transmission/reception processing independent of other units and components of the multifunction printer 100. That is, the facsimile unit 120 carries out facsimile transmission independent of other units and components of the multifunction printer 100 upon accepting data that is to be transmitted. The facsimile unit 120 carries out facsimile reception independent of other units and components of the multifunction printer 100 upon receiving data through the telephone line 20 via facsimile.

To specify the controlling operation of the control unit 110, a user can configure settings for the copying function of the multifunction printer 100 by operating the operation panel 150. Specifically, a user can set a copy magnification (i.e., scaling factor), an original-document image size, an output paper size, and the like that are related to the copying function through the manipulation of the operation panel 150. On the basis of copy settings made by the user, the control unit 110 performs control for implementing the copying function of the multifunction printer 100. The copying function of the multifunction printer 100 is implemented as follows. A specified scaling factor is applied to image data of an original read by the scanning unit 140 for multiplication processing. After the scaling processing, the printing unit 130 outputs the image data on a sheet of paper that has a specified sheet size.

The operation panel 150 includes a display screen, button switches, and arrow keys as its main hardware components. The display screen is an LCD that displays information that is related to operation. A user can input an instruction or the like by depressing the button switches with his/her finger or the like. While monitoring information that is displayed on the display screen, a user operates the button switches and the arrow keys to configure various settings of the multifunction printer 100. The settings that are configurable by the user through the operation of the operation panel 150 includes, for example, functional setting such as selection among the functions of the multifunction printer 100 including a facsimile function, a printing function, and a copying function, and apparatus-related setting such as IP address setting.

The setting administration unit 170 manages the setting state of the multifunction printer 100 and information related to users who use the functions of the multifunction printer 100. The setting administration unit 170 includes the IP-address setting unit 171, the setting change detection unit 172, the use history memory unit 173, and the notification information creation unit 174. The IP-address setting unit 171 memorizes settings of the multifunction printer 100 such as an IP address, a subnet mask, a gateway address, and the like. The setting change detection unit 172 detects a change in the setting of the IP-address setting unit 171. The use history memory unit 173 memorizes information that is related to users who use the functions of the multifunction printer 100. The notification information creation unit 174 creates information that will be notified to the users who use the functions of the multifunction printer 100.

Figure 2:
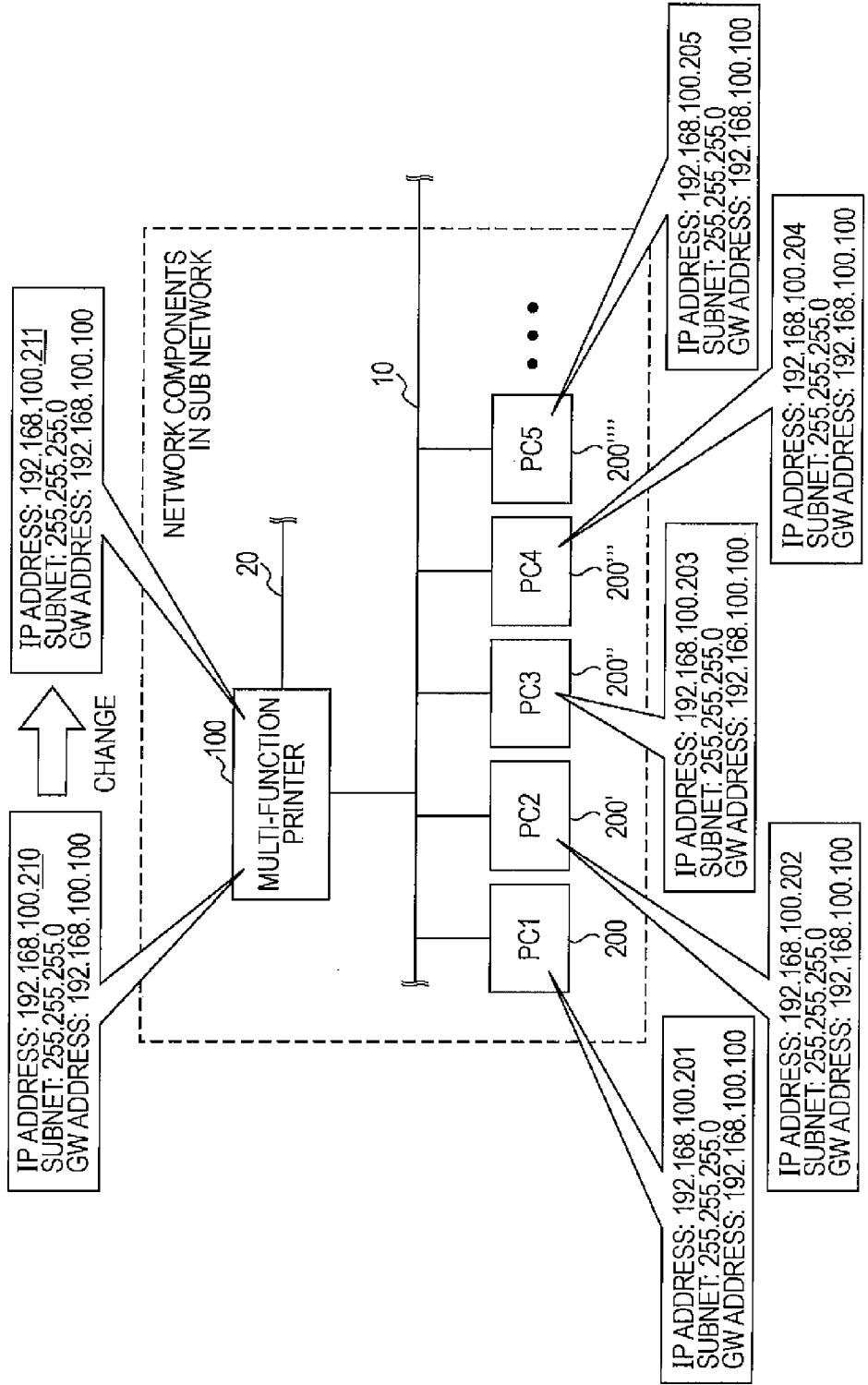
FIG. 2 is a diagram that schematically illustrates an example of the address settings of the output apparatus and the personal computers according to an exemplary embodiment of the invention.

An example of a network configuration that includes the multifunction printer 100, the personal computers 200, 200', 200", 200''', ... and the like is explained below. FIG. 2 is a diagram that schematically illustrates an example of the address settings of an output apparatus and personal computers according to an exemplary embodiment of the invention. As illustrated in FIG. 2, a person who is authorized as a network administrator configures settings on an IP address, a subnet mask, a gateway address, and the like for each terminal device that is connected to the network. In the illustrated example of FIG. 2, devices that are enclosed by a dotted box make up a sub network. However, the applicable scope of the invention is not limited to this exemplary sub-network configuration.

A network administrator sometimes changes an IP address that is assigned to the multifunction printer 100 when, for example, office floor layout is changed. In such an occasion, it is necessary for the network administrator to inform the users who use the functions of the multifunction printer 100, that is, users of the personal computers 200, 200', 200", 200''', ..., of the change in the IP address of the multifunction printer 100. In this respect, a system according to the present embodiment of the invention makes it possible to reduce the administrative burden of the network administrator because such a notification is issued automatically.

Figure 3:
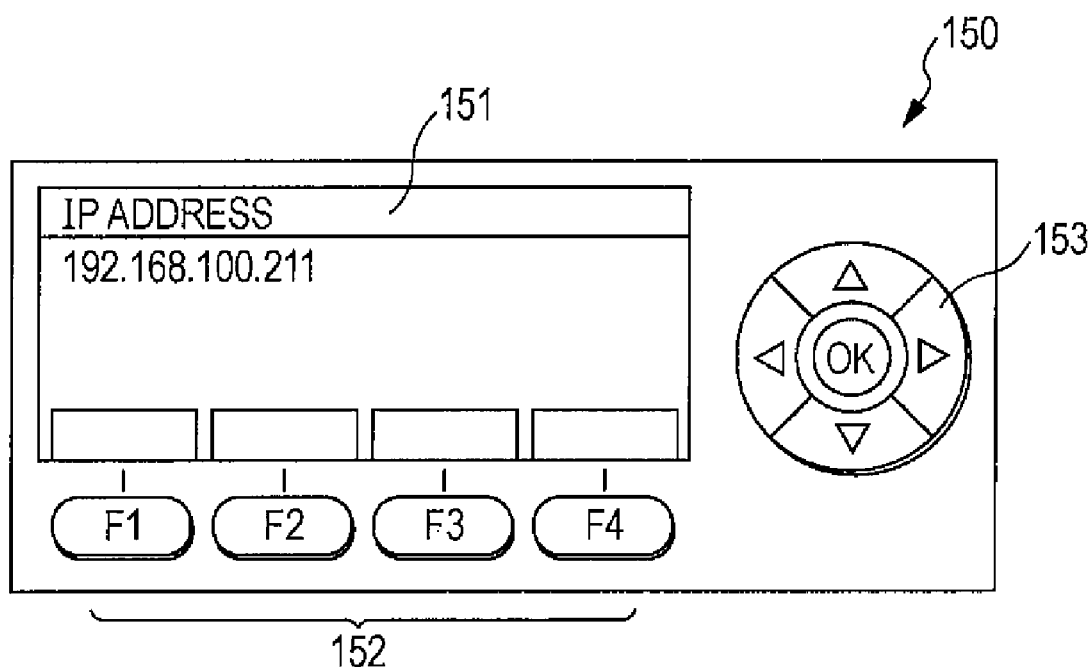
FIG. 3 is a diagram that schematically illustrates an example of the hardware configuration of an operation panel of the output apparatus according to an exemplary embodiment of the invention.

To give an illustrative example, it is assumed in the present embodiment of the invention that a network administrator has changed the IP address of the multifunction printer 100 from "192.168.100.210" to "192.168.100.211". FIG. 3 is a diagram that schematically illustrates an example of the hardware configuration of an operation panel of an output apparatus according to an exemplary embodiment of the invention. Button switches 152 are input switches for items displayed at the bottom of a display screen 151. A cross direction key 153 is made up of four-directional input arrow keys, which are used for moving a cursor on the display screen 151, for incrementing or decrementing a numeral value, and the like, and an OK key, which is depressed for finally determining inputted matters. A network administrator changes the IP address of the multifunction printer 100 from "192.168.100.210" to "192.168.100.211" by operating the operation panel 150 whose configuration is shown as an example in FIG. 3. The IP address, the subnet mask, and the gateway address set through the operation of the operation panel 150 are reflected in the IP-address setting unit 171. A change made in setting through the operation of the operation panel 150 may be reflected in the IP-address setting unit 171 when the power supply (not shown) of the multifunction printer 100 is reset.

Figures 4A, 4B:
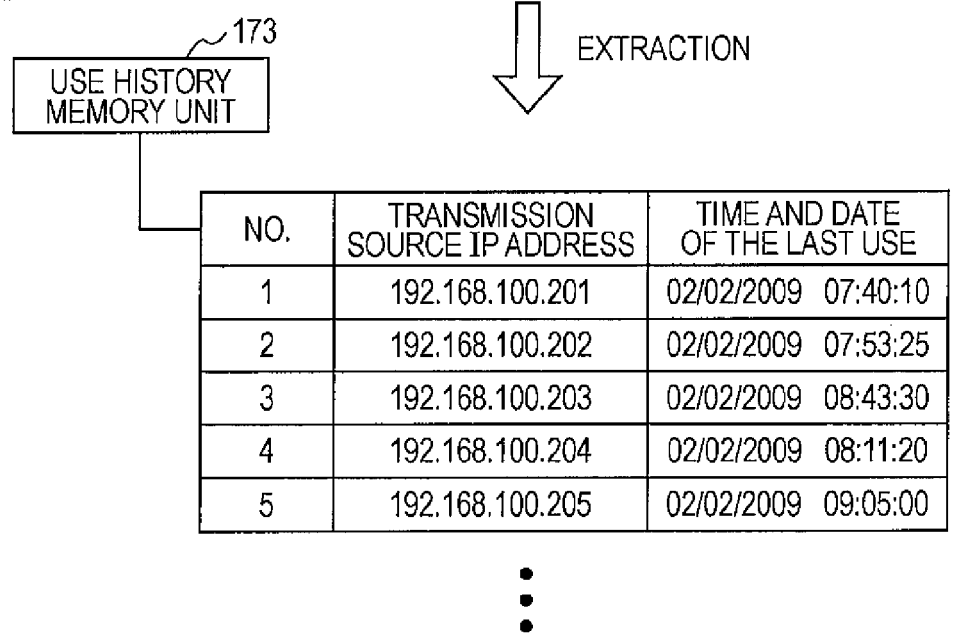
FIGS. 4A and 4B are a set of diagrams that schematically illustrates an example of information stored in a use history memory unit of the output apparatus according to an exemplary embodiment of the invention.

Next, the use history memory unit 173 of the setting administration unit 170 is explained in detail below. FIG. 4 is a set of diagrams that schematically illustrates an example of information stored in the use history memory unit 173 of an output apparatus according to an exemplary embodiment of the invention. FIG. 4A illustrates an example of the reception history of print output data received by the multifunction printer 100 from the personal computers 200, 200', 200", 200''', .... The use history memory unit 173 according to the present embodiment of the invention is configured to extract at least a "transmission source IF address" and "time and date of the last use" from the reception history of print output data and store the extracted data items. FIG. 4B illustrates an example of the table structure of data memorized in the use history memory unit 173.

Figure 5:
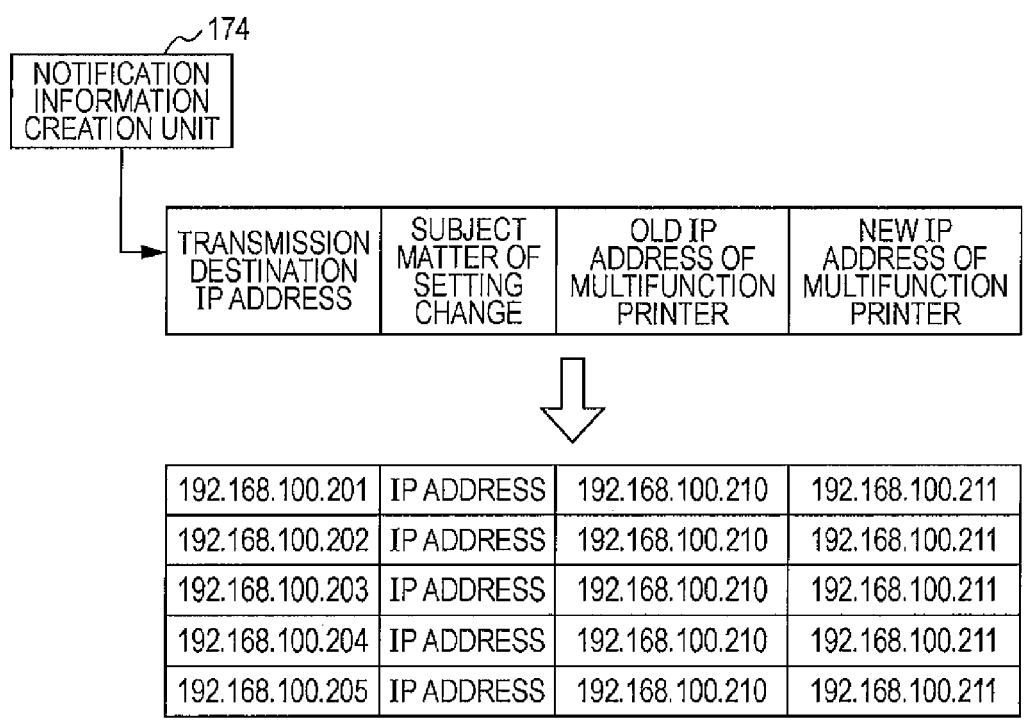
FIG. 5 is a diagram that schematically illustrates an example of notification information created by a notification information creation unit of the output apparatus according to an exemplary embodiment of the invention.

Next, the notification information creation unit 174 of the setting administration unit 170 is explained in detail below. FIG. 5 is a diagram that schematically illustrates an example of notification information created by the notification information creation unit 174 of an output apparatus according to an exemplary embodiment of the invention. The notification information creation unit 174 creates information that will be notified to users who use the functions of the multifunction printer 100 when the setting change detection unit 172 detects a change in the setting of the IF-address setting unit 171. The notification information creation unit 174 acquires users to whom a notification should be addressed from the use history memory unit 173. In addition to the above notification-transmission-destination users, the notification information creation unit 174 acquires content of the notification from the IP-address setting unit 171 and the setting change detection unit 172.

As illustrated in FIG. 5, items included in notification information created by the notification information creation unit 174 are, for example, "transmission destination IP addresses", "the subject matter of a setting change", "the old IP address of the multifunction printer 100", and "the new IP address of the multifunction printer 100". FIG. 5 is a diagram that illustrates an example of notification information created in order to inform personal computers PC1, PC2, PC3, PC4, and PC5 of a change in the IP address of the multifunction printer 100 from "192.168.100.210" to "192.168.100.211". The personal computers PC1, PC2, PC3, PC4, and PC5 are terminals that frequently transmit print output data to the multifunction printer 100.

Figure 6:
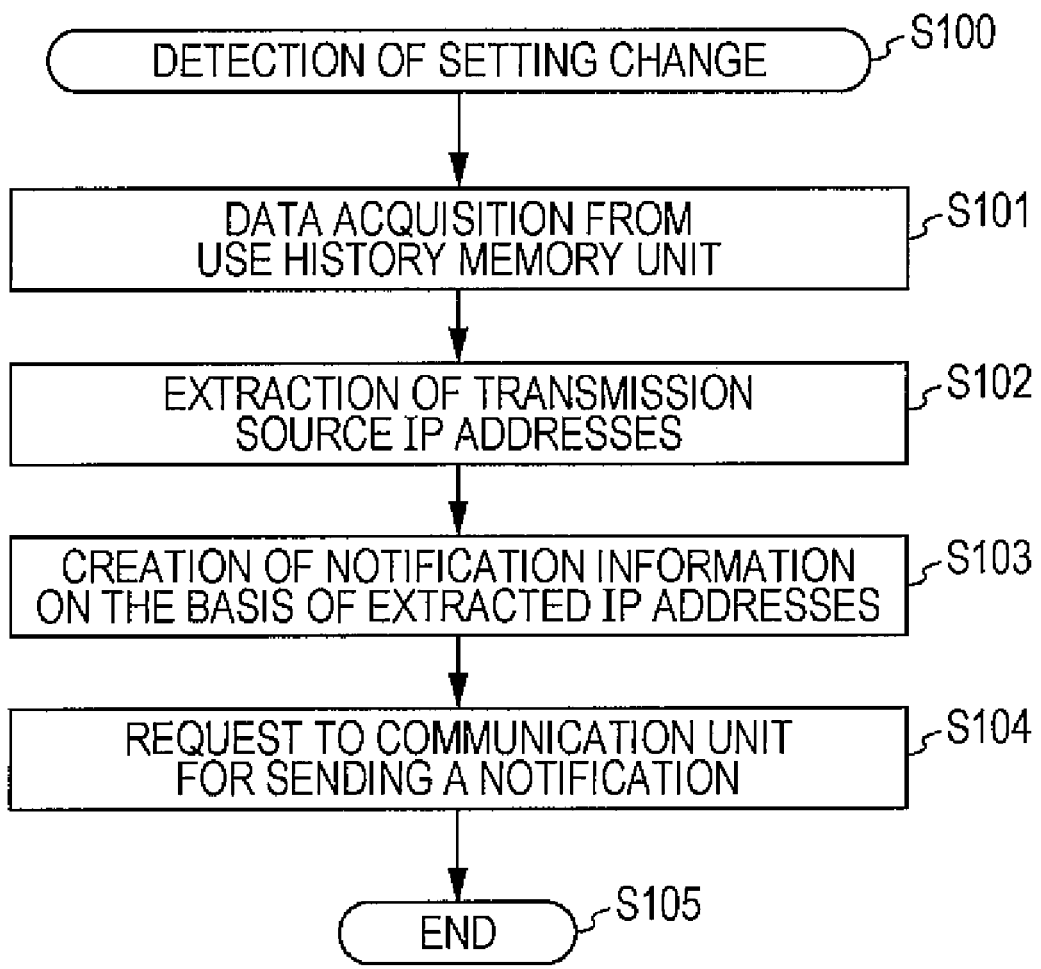
FIG. 6 is a flowchart that schematically illustrates an example of a processing flow that is initiated when a setting change is detected in the output apparatus according to an exemplary embodiment of the invention.
Figure 9:
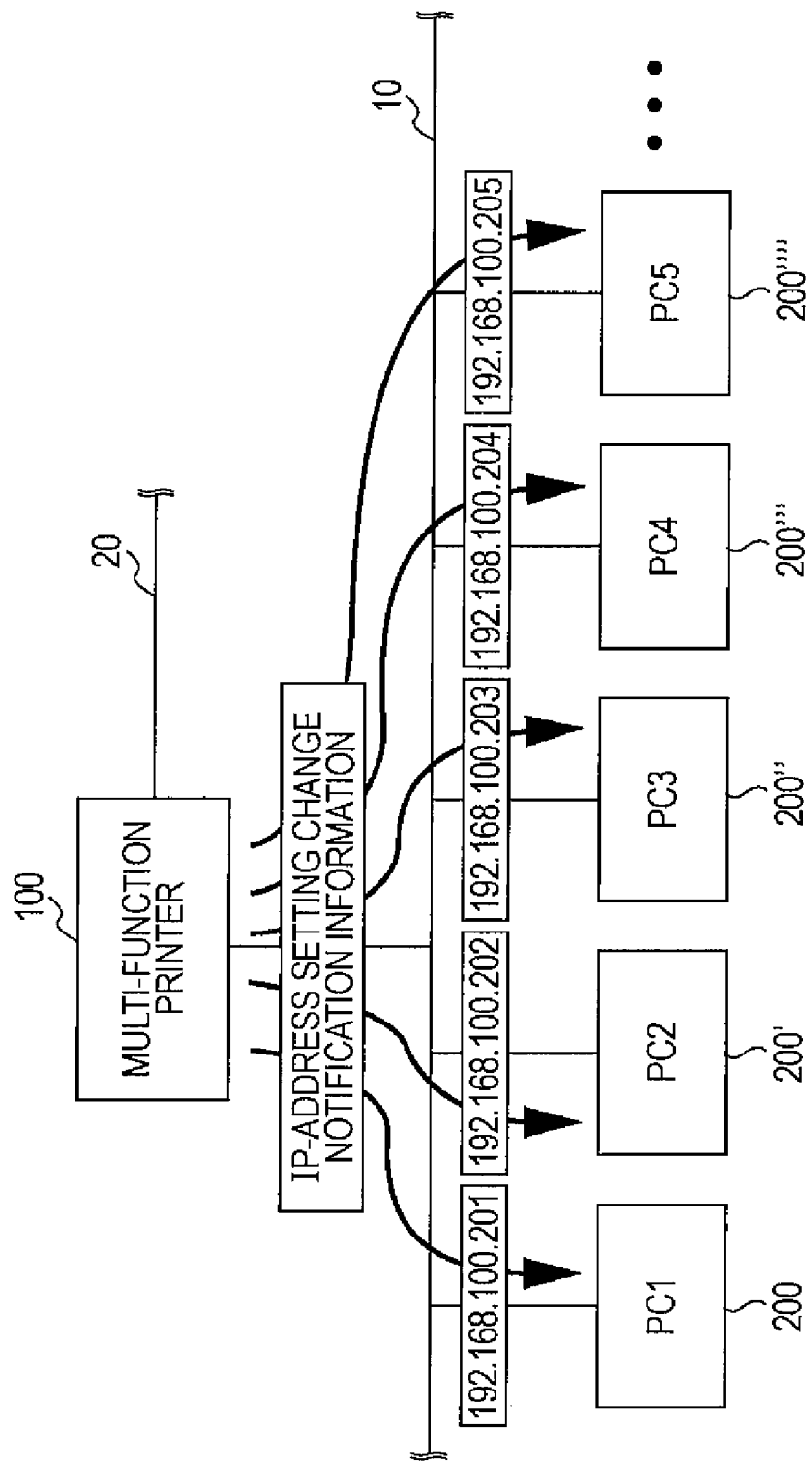
FIG. 9 is a diagram that schematically illustrates an example of the processing/operation of the output apparatus according to an exemplary embodiment of the invention.

Next, an explanation is given of processing operation that is performed when a network administrator has changed the IP address of the multifunction printer 100 having the above configuration. FIG. 6 is a flowchart that schematically illustrates an example of a processing flow that is initiated when a setting change is detected in an output apparatus according to an exemplary embodiment of the invention. The process shown in the flowchart of FIG. 6 starts at the time when the setting change detection unit 172 detects a change in the setting of the IP-address setting unit 171. After the start of the process in a step S100 of FIG. 6, it proceeds to a step S101. In the step S101, use history data (which is shown in FIG. 4B) is taken out of the use history memory unit 173. Next, in a step S102, transmission source IP addresses are extracted from the use history data. In a step S103, the notification information creation unit 174 creates notification information (which is shown in FIG. 5) while setting the extracted IP addresses as transmission destination addresses. In a step S104, the communication unit 160 is requested to transmit the notification information created by the notification information creation unit 174. Then, as illustrated in FIG. 9, the communication unit 160 transmits the notification information to each transmission destination that is indicated by the corresponding IP address to inform it of the change in the setting of the IP address of the multifunction printer 100. The process ends at a step S105 after the step S104.

When a change in the setting of an IP-address setting section (e.g., the IP-address setting unit 171) is detected, the notification information creation unit 174 creates information that will be notified to personal computers (e.g., PC1, PC2, PC3, PC4, and PC5) that satisfy predetermined conditions. Then, the created notification information is sent to the personal computers PC1, PC2, PC3, PC4, and PC5. Since it is not necessary for a network administrator to inform users who use the functions of the multifunction printer 100 of the change in the IP address, the administrative burden of the network administrator is reduced. Moreover, since it is possible to ensure that the fact that the IP-address setting of the IP-address setting section has been changed will be always notified to the users who use the functions of the multifunction printer 100, the users will not be affected by the change in the IP address due to, for example, a change in office floor layout and thus can continue the use of the multifunction printer 100 for printing.

Figure 7:
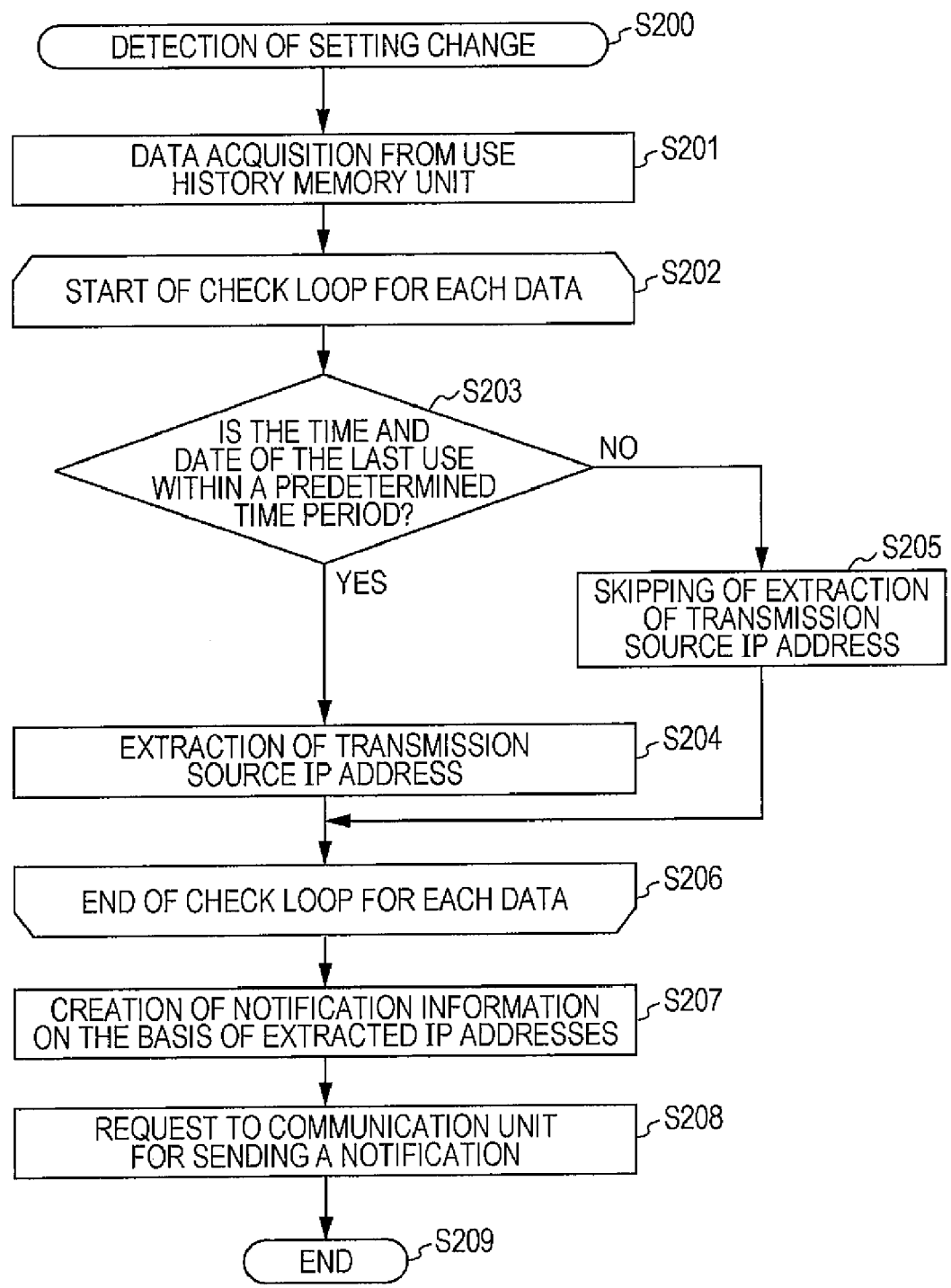
FIG. 7 is a flowchart that schematically illustrates an example of a processing flow according to another embodiment of the invention, which is initiated when a setting change is detected in the output apparatus.

Next, another embodiment of the invention is explained. FIG. 7 is a flowchart that schematically illustrates an example of a processing flow according to another embodiment of the invention, which is initiated when a setting change is detected in an output apparatus. The present embodiment is different from the foregoing embodiment in terms of processing operation that is performed when the setting change detection unit 172 detects a change in the setting of the IP-address setting unit 171. With reference to a processing flowchart of FIG. 7, the difference between the present embodiment and the foregoing embodiment is explained below.

Processing is initiated in a step S200 of FIG. 7. After the step S200, the process proceeds to a step S201. In the step S201, use history data (which is shown in FIG. 4B) is taken out of the use history memory unit 173. Subsequent steps from S202 to S206 constitute a check loop for making a judgment for each entry data of the use history data. After the completion of check for all use history data, the process leaves from the check loop of the steps S202 to S206 to proceed to a step S207.

In the check loop, with reference to the "time and date of the last use" of the use history data, it is judged in a step S203 whether the time and date of the last use is within a predetermined time period (e.g., 240 hours) or not. If the judgment result of the step S203 is YES, the process proceeds to a step S204. In the step S204, the transmission source IP address of the data is extracted. If the judgment result of the step S203 is NO, the process proceeds to a step S205. In this case, the transmission source IP address of the data is not extracted.

In the step S207 after the above check loop, the notification information creation unit 174 creates notification information (which is shown in FIG. 5) while setting the extracted IP addresses as transmission destination addresses. In a step S208, the communication unit 160 is requested to transmit the notification information created by the notification information creation unit 174. Then, as illustrated in FIG. 9, the communication unit 160 transmits the notification information to each transmission destination that is indicated by the corresponding IP address to inform it of the change in the setting of the IP address of the multifunction printer 100. The process ends at a step S209 after the step S208.

In addition to the same advantageous effect as that produced by the foregoing embodiment, the present embodiment including the above loop processing produces an additional effect of avoiding unnecessary notification. That is, users of personal computers who did not use the functions of the multifunction printer 100 continuously for a long time period, for example, users whose disuse time period is not shorter than ten days, are screened out. No IP-address setting change notification information is sent to such a user.

Figure 8:
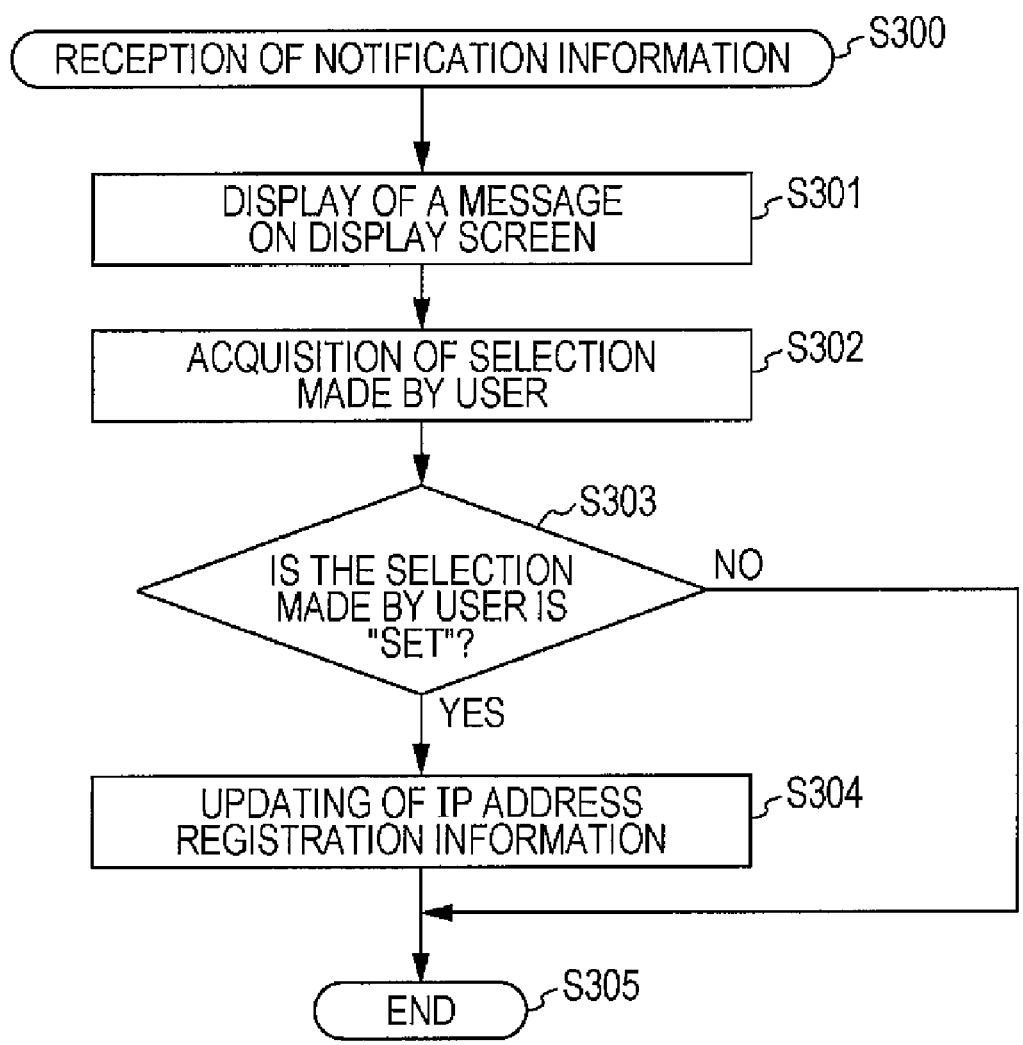
FIG. 8 is a flowchart that schematically illustrates an example of a processing flow that is initiated when notification information is received by an information processing device according to an exemplary embodiment of the invention.
Figure 10:
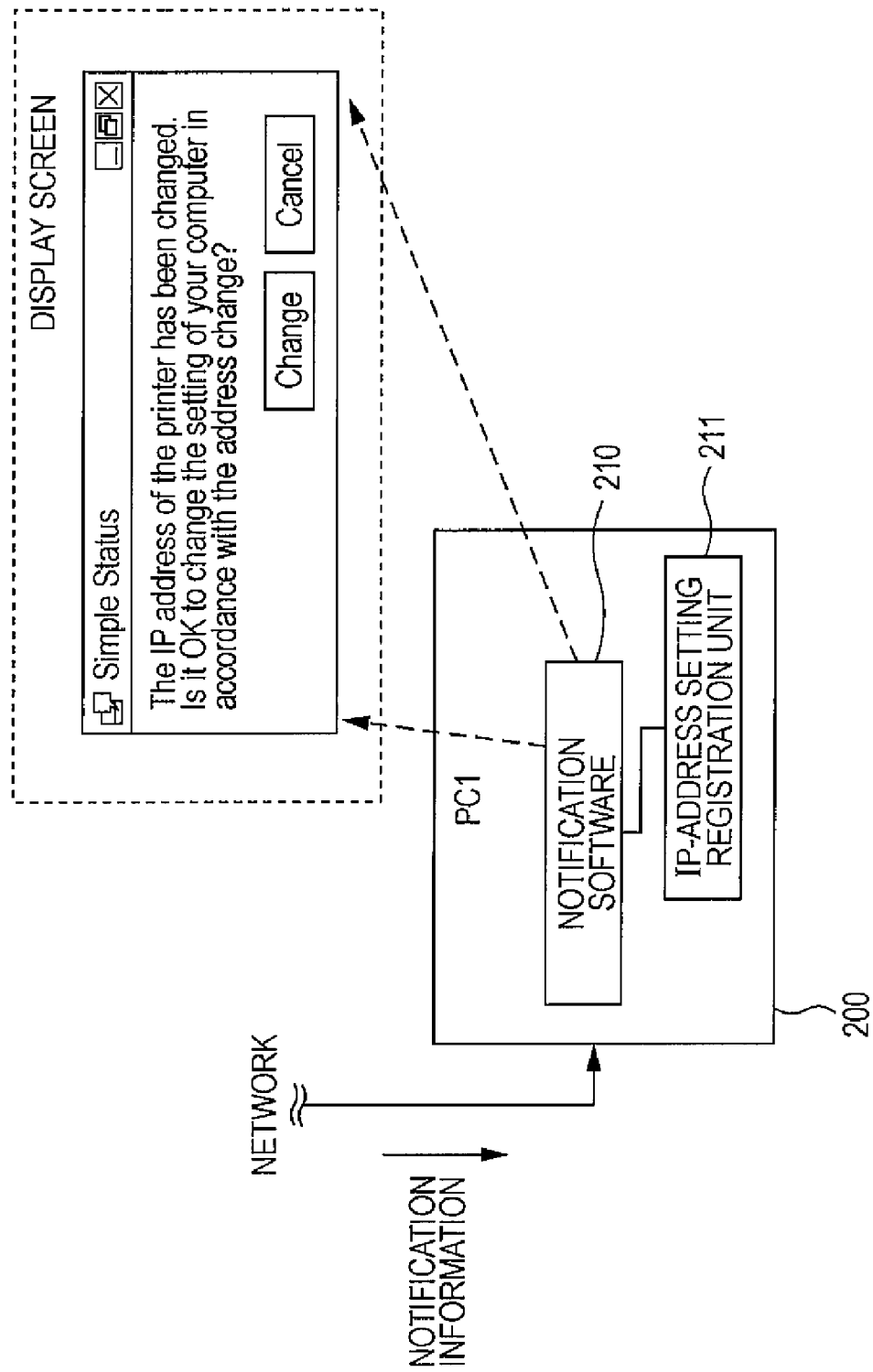
FIG. 10 is a diagram that schematically illustrates an example of the operation of an information processing device at the time of the reception of notification information according to an exemplary embodiment of the invention.

Next, operation processing that is performed when a personal computer (information processing device) has received IP-address setting change notification information is explained. FIG. 8 is a flowchart that schematically illustrates an example of a processing flow that is initiated when notification information is received by an information processing device according to an exemplary embodiment of the invention. FIG. 10 is a diagram that schematically illustrates an example of the operation of an information processing device at the time of the reception of notification information according to an exemplary embodiment of the invention. In FIG. 10, reference numerals 210 and 211 denote notification software and an IP-address setting registration unit, respectively. The notification software 210 is software that runs on a personal computer and is used when the multifunction printer 100 is used from the personal computer. The IP-address setting registration unit 211 is a memory unit that stores the settings of the multifunction printer 100.

Processing is initiated in a step S300 when a personal computer receives notification information from the multifunction printer 100. The process proceeds to a step S301 after the step S300. In the step S301, the notification software 210 displays a message on the display screen (not shown) of the personal computer.

An example of the displayed message is illustrated in FIG. 10. In the present embodiment of the invention, a message that reads as, for example, "The IP address of the printer has been changed. Is it OK to change the setting of your computer in accordance with the address change?" is displayed as a message window on the display screen. In addition, selection buttons such as a "Change" button and a "Cancel" button, which can be chose with a pointing device, are displayed next to each other in the window.

In a step S302, the selection made by the user with the use of the pointing device is acquired. In a step S303, it is judged whether the selection made by the user is "Set" or not. If the judgment result of the step S303 is YES, the process proceeds to a step S304. In the step S304, the registration information of the IP-address setting registration unit 211 is updated on the basis of the notification information. If the judgment result of the step S303 is NO, the operation of the step S304 is skipped. In this case, the process proceeds to a step S305 at which the processing ends.

As described above, in the present embodiment of the invention, it is possible to ensure that a change in the IP address of the multifunction printer 100 is notified to each user at a personal-computer (information-processing-device) side. Therefore, users who use the functions of the multifunction printer 100 will not be affected by the change in the IP address due to, for example, a change in office floor layout and thus can continue the use of the multifunction printer 100 for printing.

Figure 11:
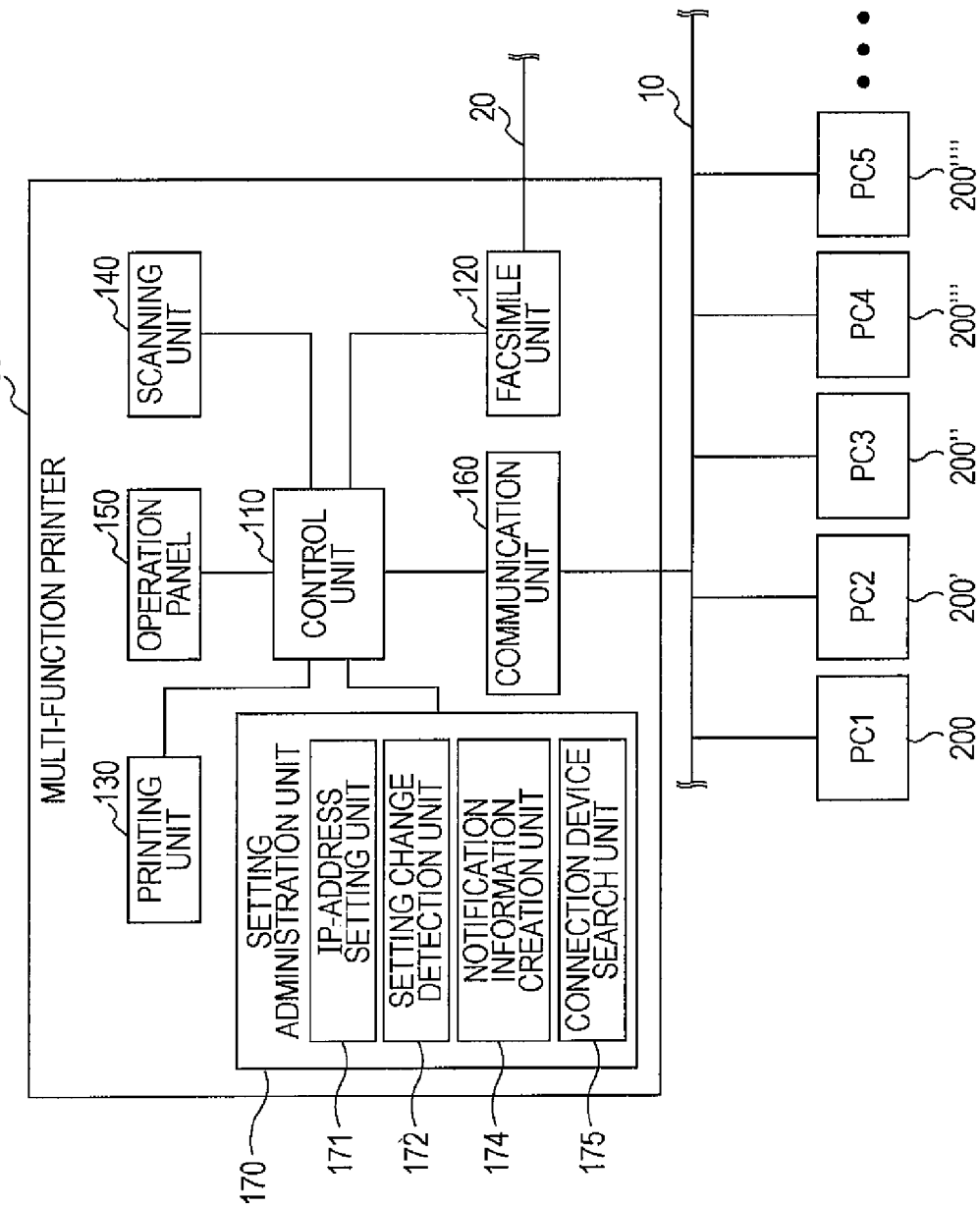
FIG. 11 is a block diagram that schematically illustrates an example of the configuration of an output apparatus (multifunction printer) and peripheral system devices according to another embodiment of the invention.

Next, another embodiment of the invention is explained. FIG. 11 is a block diagram that schematically illustrates an example of the configuration of an output apparatus (multifunction printer) and peripheral system devices according to another embodiment of the invention. The difference between a network system according to the present embodiment of the invention and a network system according to the foregoing first embodiment of the invention lies in the configuration of the setting administration unit 170. The setting administration unit 170 according to the first embodiment of the invention includes the use history memory unit 173, which memorizes history information on the use of the multifunction printer 100 by users. In contrast, the use history memory unit 173 is omitted in the configuration of the setting administration unit 170 according to the present embodiment of the invention. Specifically, the setting administration unit 170 is provided with a connection device search unit 175 in place of the use history memory unit 173. The connection device search unit 175 searches for personal computers (information processing devices) that are connected to the network. A popular conventional network technique can be employed for the connection device search unit 175. Except for the adoption of the connection device search unit 175 and the omission of the use history memory unit 173, a network system according to the present embodiment of the invention is the same as a network system according to the first embodiment of the invention.

When a change in the setting of the IP-address setting section (e.g., the IP-address setting unit 171) is detected, the connection device search unit 175 searches for personal computers (information processing devices) that are connected to the network. The multifunction printer 100 transmits IP-address setting change notification information to the found personal computers. Since it is not necessary for a network administrator to inform users who use the functions of the multifunction printer 100 of the change in the IP address, the administrative burden of the network administrator is reduced. Moreover, since it is possible to ensure that the fact that the IP-address setting of the IP-address setting section has been changed will be always notified to the users who use the functions of the multifunction printer 100, the users will not be affected by the change in the IP address due to, for example, a change in office floor layout and thus can continue the use of the multifunction printer 100 for printing.

In the present embodiment of the invention, the transmission destinations of notification information are determined on the basis of the result of a search conducted by the connection device search unit 175 instead of using use history data stored in the use history memory unit 173. Therefore, it is possible to send IP-address setting information to each personal computer (information processing device) even when the multifunction printer 100 is connected anew to a network.

Figure 12:
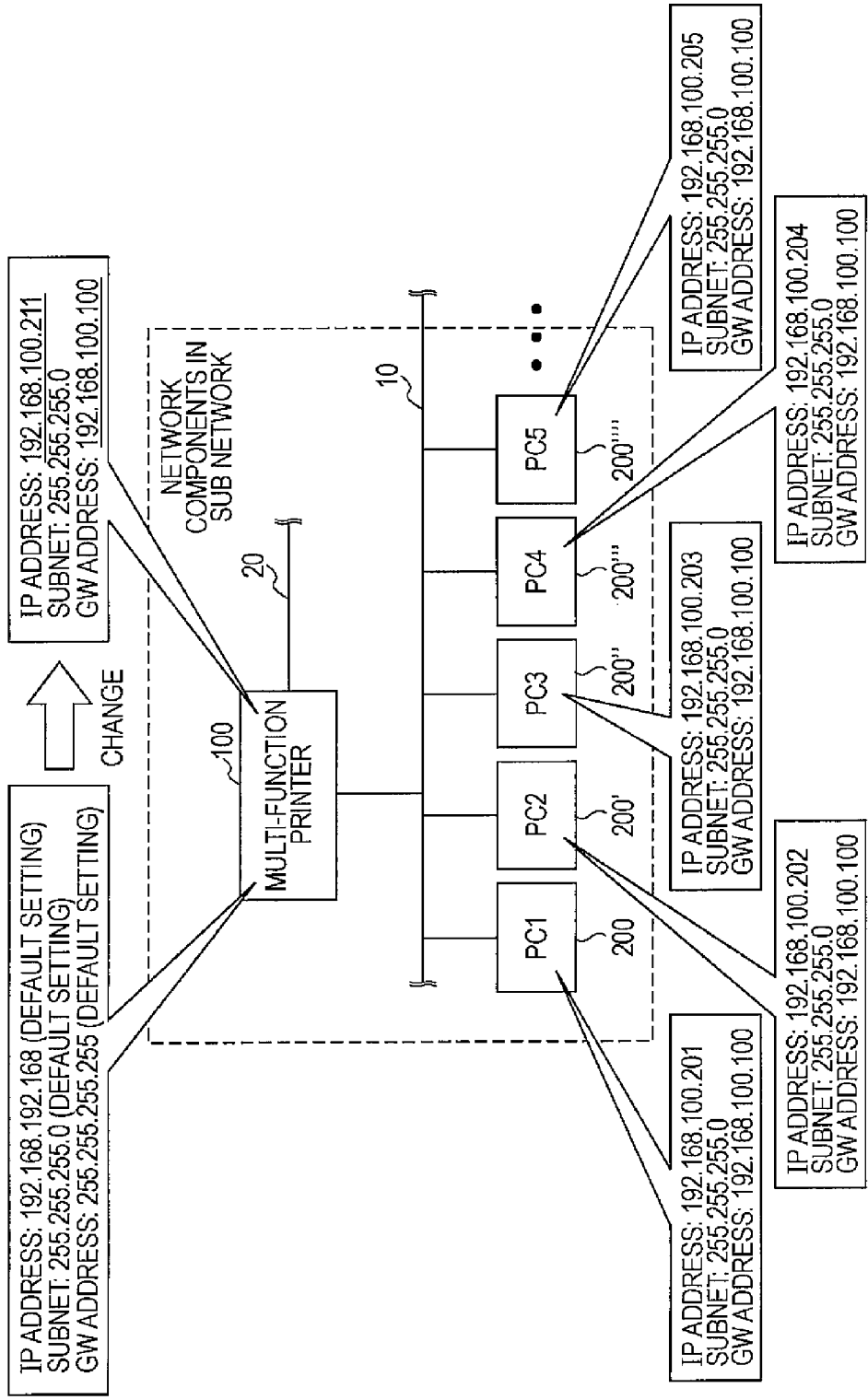
FIG. 12 is a diagram that schematically illustrates an example of the address settings of the output apparatus and the personal computers according to another embodiment of the invention.

FIG. 12 is a diagram that schematically illustrates an example of the address settings of an output apparatus and personal computers according to another embodiment of the invention. FIG. 12 shows a connection situation in which the multifunction printer 100 is connected anew to an existing network to which the personal computers 200, 200', 200", 200''', . . . are connected. In such an occasion, a network administrator changes the setting of an IP address, a subnet mask, and a gateway address for the newly connected multifunction printer 100 from its default setting to appropriate setting, which is suited for the network. In the illustrated example, the network administrator changes the IP address from "192.168.192.168 (default setting)" to "192.168.100.211" and the gateway address from "255.255.255.255 (default setting)" to "192.168.100.100". The subnet mask of "255.255.255.0 (default setting)" remains to be its initial state.

Figure 13:
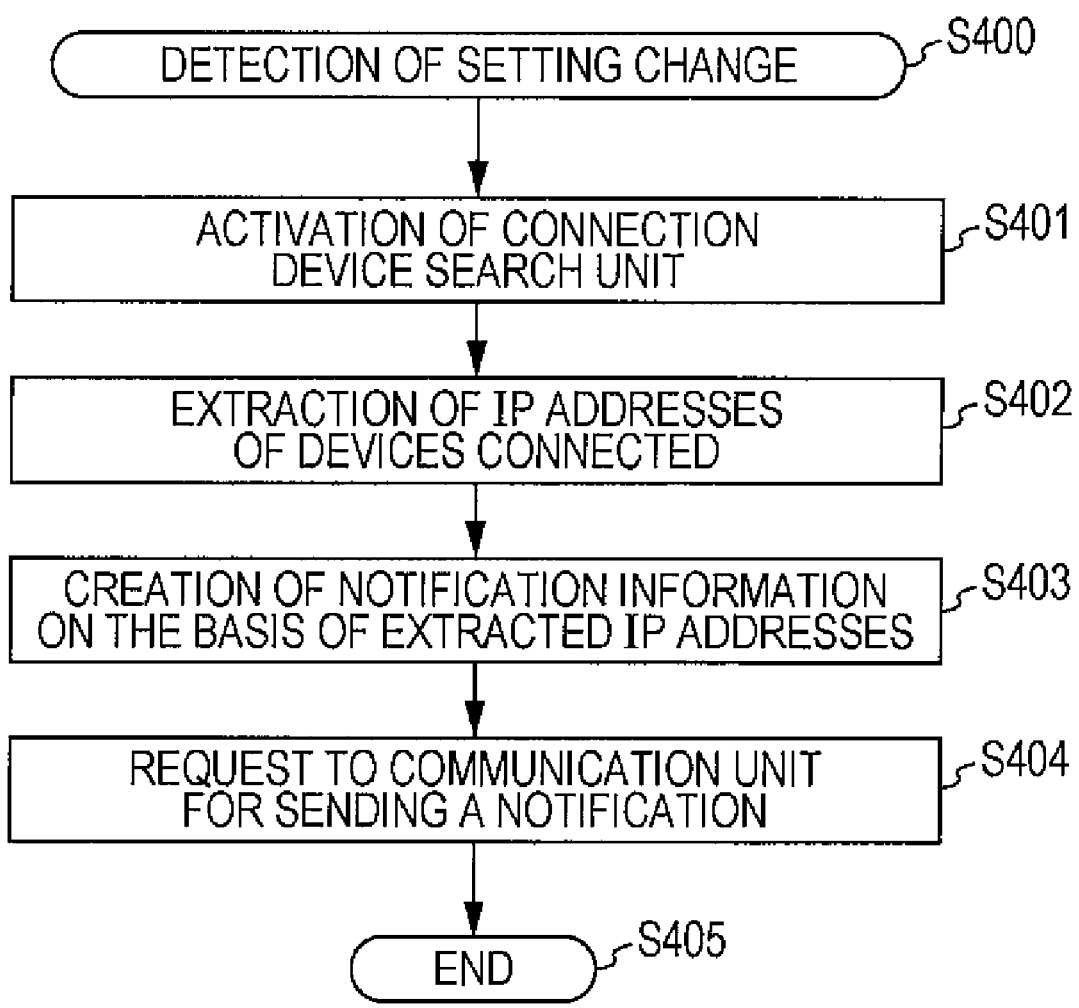
FIG. 13 is a flowchart that schematically illustrates an example of a processing flow that is initiated when a setting change is detected in the output apparatus according to another embodiment of the invention.

Next, an explanation is given of processing operation that is performed when the multifunction printer 100 is added anew with the setting of an IP address thereof by a network administrator. FIG. 13 is a flowchart that schematically illustrates an example of a processing flow that is initiated when a setting change is detected in an output apparatus according to another embodiment of the invention. The process shown in the flowchart of FIG. 13 starts at the time when the setting change detection unit 172 detects a change in the setting of the IP-address setting unit 171.

The process starts in a step S400 of FIG. 13. Then, it proceeds to a step S401. In the step S401, the connection device search unit 175 is activated. The connection device search unit 175 gathers information (such as IP addresses and the like, inclusive of MAC addresses) on personal computers (information processing devices) that are connected to the network. Next, in a step S402, transmission source IP addresses are extracted from the data gathered by the connection device search unit 175. In a step S403, the notification information creation unit 174 creates notification information (which is shown in FIG. 5) while setting the extracted IP addresses as transmission destination addresses. In a step S404, the communication unit 160 is requested to transmit the notification information created by the notification information creation unit 174. Then, as illustrated in FIG. 9, the communication unit 160 transmits the notification information to each transmission destination that is indicated by the corresponding IP address to inform it of the change in the setting of the IP address of the multifunction printer 100. The process ends at a step S405 after the step S404.

When a change in the setting (new setting) of the IP-address setting section (e.g., the IP-address setting unit 171) is detected, the connection device search unit 175 is activated. The connection device search unit 175 searches for personal computers (e.g., PC1, PC2, PC3, PC4, and PC5) that satisfy predetermined conditions. The notification information creation unit 174 creates information that will be notified to the personal computers PC1, PC2, PC3, PC4, and PC5. Then, the notification information is sent to these personal computers. Since it is not necessary for a network administrator to inform users who use the functions of the multifunction printer 100 of the change in the IP address, the administrative burden of the network administrator is reduced. Moreover, since it is possible to ensure that the fact that the IP address of the IP-address setting section has been set/changed will be notified to the users who use the functions of the multifunction printer 100, the users can continue the use of the multifunction printer 100 for printing when the IP address is set/changed due to, for example, a change in office floor layout.

Although exemplary embodiments of the present invention are described above, the invention is not restricted to the exemplary embodiment described herein; the invention can be implemented in a variety of variations or modifications without departing from the gist, the spirit, and the scope thereof. The foregoing embodiments may be combined with each other or one another, which is also encompassed within the applicable scope of the invention.

The entire disclosure of Japanese Patent Application No. 2009-053469, filed Mar. 6, 2009 is expressly incorporated by reference herein.

What is claimed is:

1. An output apparatus comprising:
    an IP address setting section that sets an IP address of the output apparatus;
    a setting change detecting section that detects a change in setting of the IP address setting section;
    a use history memory section storing a time of last use of the output apparatus by a device; and
    a notification information creating section that creates information that will be notified to the device based on the detection of the setting change by the setting change detecting section and the stored time of last use by the device within a predetermined time period, wherein the notification information creating section prevents notification of the created information to the device if the stored time of last use by the device is older than a length of the predetermined time period.

2. The output apparatus according to claim 1, further comprising an address memorizing section that memorizes an IP address of the device that transmitted the output data to the output apparatus.

3. The output apparatus according to claim 1, wherein the device is connected to the same local area network as that of the output apparatus.

4. The output apparatus according to claim 1, wherein the device is connected to the same sub network as that of the output apparatus.

5. An output apparatus comprising:
an IP address setting section that sets an IP address of the output apparatus;
a setting change detecting section that detects new setting of the IP address setting section when the setting is configured anew;
a use history memory section storing a time of last use of the output apparatus by a device; and
a notification information creating section that creates information that will be notified to the device based on the detection of the new setting by the setting change detecting section and the stored time of last use by the device within a predetermined time period,
wherein the notification information creating section prevents notification of the created information to the device if the stored time of last use by the device is older than a length of the predetermined time period.

6. An information processing apparatus comprising:
an IP address registering section that performs registration processing related to an IP address of an output apparatus;
a receiving section that receives, from the output apparatus, data for notifying the information processing apparatus that the IP address of the output apparatus has been changed;
a notification section that displays that the IP address of the output apparatus has been changed if a length of time since a last use of the output apparatus by the information processing apparatus is not older than a length of a predetermined time period;
an operation section that accepts direct user input at the information processing apparatus whether to accept the change of the IP address of the output apparatus; and
a registration information changing section that changes registration information held by the IP address registering section according to reception of the data that notifies the information processing apparatus of the change in the IP address of the output apparatus by the receiving section and the input of the operation section of whether to accept the change of the IP address of the output apparatus.

7. A network system comprising:
an output apparatus that includes
an IP address setting section that sets an IP address of the output apparatus,
a setting change detecting section that detects a change in setting of the IP address setting section,
a use history memory section storing a time of last use of the output apparatus by a device, and
a notification information creating section that creates information that will be notified to the device based on the detection of the setting change by the setting change detecting section and the stored time of last use by the device within a predetermined time period, wherein the notification information creating section prevents notification of the created information to the device if the stored time of last use by the device is older than a length of the predetermined time period; and
an information processing apparatus that includes
an IP address registering section that performs registration processing related to an IP address of an output apparatus,
a receiving section that receives, from the output apparatus, data for notifying the information processing apparatus that the IP address of the output apparatus has been changed, and
a registration information changing section that changes registration information held by the IP address registering section upon reception of the data that notifies the information processing apparatus of the change in the IP address of the output apparatus by the receiving section.

* * * * *